United States Patent
Hsieh et al.

(10) Patent No.: US 8,437,073 B2
(45) Date of Patent: May 7, 2013

(54) ELECTROPHORETIC DISPLAY DEVICE

(75) Inventors: Ming-Che Hsieh, Hsin-Chu (TW); Shih-Hsing Hung, Hsin-Chu (TW); Chih-Jen Hu, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 262 days.

(21) Appl. No.: 12/848,522

(22) Filed: Aug. 2, 2010

(65) Prior Publication Data
US 2011/0273760 A1 Nov. 10, 2011

(30) Foreign Application Priority Data
May 6, 2010 (TW) .............................. 99114464 A

(51) Int. Cl.
*G02B 26/00* (2006.01)
*G09G 3/34* (2006.01)

(52) U.S. Cl.
USPC ........................................ 359/296; 345/107

(58) Field of Classification Search .................. 359/296; 345/107
See application file for complete search history.

(56) References Cited

U.S. PATENT DOCUMENTS
2009/0034057 A1* 2/2009 LeCain et al. ................ 359/296

FOREIGN PATENT DOCUMENTS
JP 2009-28945 A 2/2009

OTHER PUBLICATIONS
CN Office Action issued on Nov. 24, 2011.

* cited by examiner

*Primary Examiner* — Evelyn A. Lester
(74) *Attorney, Agent, or Firm* — WPAT, PC; Justin King

(57) ABSTRACT

A display device includes a display panel, a barrier layer, a protective layer, a first optical adhesive layer and a second optical adhesive layer. The barrier layer is disposed above the display panel. The protective layer is disposed above the barrier layer. The first optical adhesive layer with a first thickness is disposed between the display panel and the barrier layer. The second optical adhesive layer with a second thickness is disposed between the protective layer and the barrier layer. The first thickness is larger than the second thickness.

11 Claims, 2 Drawing Sheets

ELECTROPHORETIC DISPLAY DEVICE

CROSS-REFERENCE TO RELATED APPLICATION

This application claims the priority benefit of Taiwan application serial No. 099114464, filed on May 6, 2010. The entirety of the above-mentioned patent application is incorporated herein by reference and made a part of this specification.

BACKGROUND

1. Technical Field

The present invention relates to a display device, and more particular relates to a display device with improved impact resistance strength.

2. Description of the Related Art

Flexible display devices have some advantages, such as light in weight, thin in thickness, flexible and not easy to be broken. Therefore, usage of the flexible display devices has become an important development trend. Generally, the flexible display devices are electrophoretic display (EPD) devices, which can display image through controlling distribution of charged particles within display region by electric filed to change reflectivity of the incident ambient light. Base on the above display principle, the electrophoretic display devices have bistability and need no additional light source. Therefore, the electrophoretic display devices can meet the need of power-saving feature of the flexible display devices.

FIG. 1 is a schematic cross-sectional view of a conventional electrophoretic display device. Referring to FIG. 1, the conventional electrophoretic display device 100 includes an electrophoretic display panel 110 and at least one functional layer 120. The functional layer 120 is disposed on the electrophoretic display panel 110. The functional layer 120 can be a barrier layer for preventing the electrophoretic display panel 110 from infiltrating moisture, a protective layer for preventing the electrophoretic display panel 110 from being scratched by an external force, or an optical film with anti-glare, anti-reflective or anti-fogging function. However, in the conventional electrophoretic display device 100, the functional layer 120 does not have sufficient impact resistance strength. Therefore, if the electrophoretic display device 100 is impacted by an external force, the display unit in the electrophoretic display panel 110 may be damaged. Consequently, some problems, such as abnormal displaying of the electrophoretic display device 100, may be appears.

BRIEF SUMMARY

The present invention provides a display device that has improved impact resistance strength.

The present invention provides a display device, which includes a display panel, a barrier layer, a protective layer, a first optical adhesive layer and a second optical adhesive layer. The barrier layer is disposed above the display panel. The protective layer is disposed above the barrier layer. The first optical adhesive layer with a first thickness is disposed between the display panel and the barrier layer. The second optical adhesive layer with a second thickness is disposed between the protective layer and the barrier layer. The first thickness is larger than the second thickness.

In an embodiment of the present invention, the display panel is an electrophoretic display panel.

In an embodiment of the present invention, the display panel is a micro-cup electrophoretic display panel or a micro-capsule electrophoretic display panel.

In an embodiment of the present invention, material of the first optical adhesive layer and the second optical adhesive layer includes optical clear adhesive (OCA).

In an embodiment of the present invention, the first thickness is twice as large as the second thickness.

In an embodiment of the present invention, the display device further includes at least one optical film disposed on the protective layer.

In an embodiment of the present invention, the protective layer has an optical treatment surface and a back surface opposite to each other, and the back surface is located on the second optical adhesive layer.

In an embodiment of the present invention, the optical treatment surface includes an anti-reflective surface or an anti-glare surface.

In an embodiment of the present invention, material of the barrier layer includes waterproof material or silicon dioxide.

In an embodiment of the present invention, material of the protective layer includes plastic.

In an embodiment of the present invention, the material of the protective layer includes polyethylene terephthalate.

In the display device of the present invention, the first optical adhesive layer that is disposed between the display panel and the barrier layer is not deformed easily due to the impact force, and the thickness of the first optical adhesive layer is larger than that of the second optical adhesive layer disposed between the protective layer and the barrier layer. Therefore, with the relatively thick first optical adhesive layer, the display device can have sufficient impact resistance strength, and thus the lifetime of the display device would be increased.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
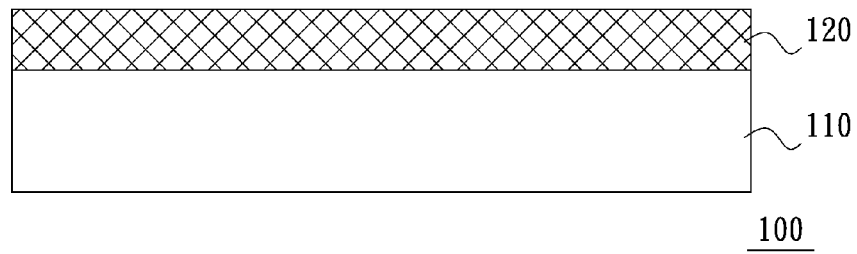
FIG. 1 is a schematic cross-sectional view of a conventional electrophoretic display device.
Figure 2:
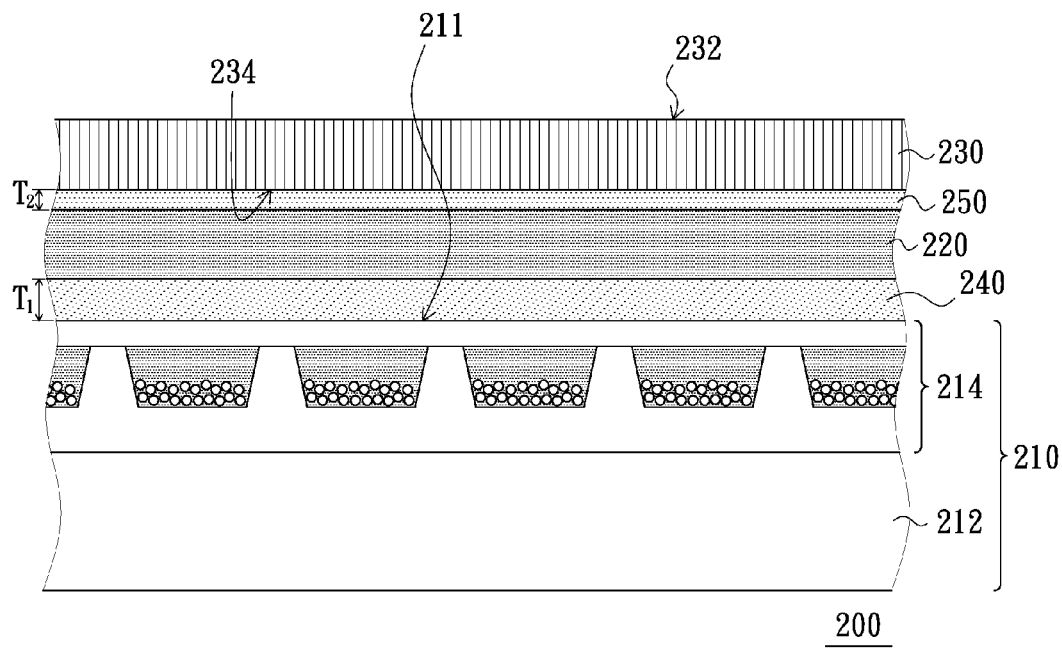
FIG. 2 is a schematic cross-sectional view of a display device according to an embodiment of the present invention.
Figure 3:
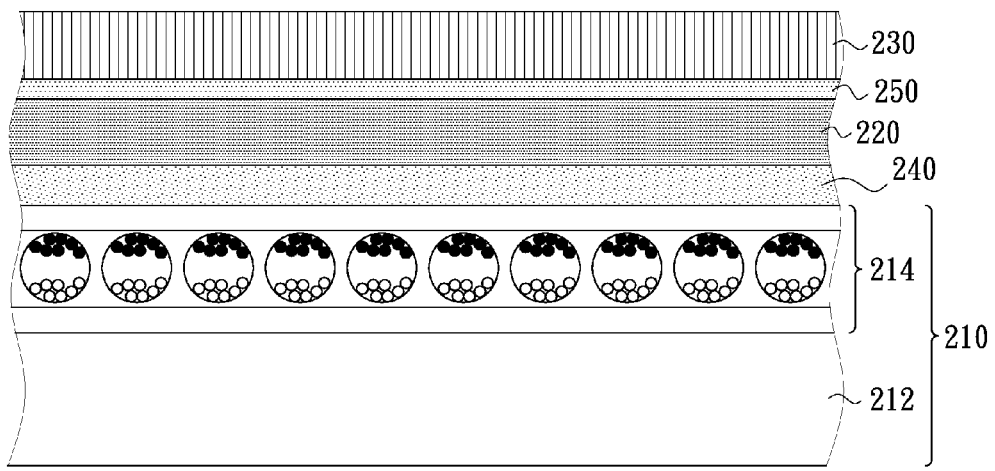
FIG. 3 is a schematic cross-sectional view of a display device according to another embodiment of the present invention.

FIG. 2 is a schematic cross-sectional view of a display device according to an embodiment of the present invention. Referring to FIG. 2, the display device 200 includes a display panel 210, a barrier layer 220, a protective layer 230, a first optical adhesive layer 240 and a second optical adhesive layer 250. The display panel 210 is, for example, an electrophoretic display panel. In details, the display panel 210 is composed of an active matrix substrate 212 and an electrophoretic layer 214. The active matrix substrate 212 can be a thin film transistor array substrate, and the present invention is not limited herein. The display panel 210 can be a micro-cup electrophoretic display panel or a microcapsule electrophoretic display panel. In other words, the electrophoretic layer 214 can be a micro-cup electrophoretic layer (as shown in FIG. 2), or a microcapsule electrophoretic layer (as shown in FIG. 3), and the present invention is not limited herein.

Referring to FIG. 2 again, the protective layer 230 is disposed above the electrophoretic layer 214 of the display panel 210. The protective layer 230 can be made of transparent plastic material, such as, polyethylene terephthalate (PET). Due to poor water resistance of the plastic material, in order to prevent the electrophoretic layer 214 from being infiltrated by moisture or oxygen gas, the barrier layer 220 is disposed between the display panel 210 and the protective layer 230 in the display device 200. In this embodiment, the barrier layer 220 can be made of silicon oxide, such as, silicon dioxide.

The first optical adhesive layer 240 is disposed between the display panel 210 and the barrier layer 220, so that the barrier layer 220 can be bonded on the electrophoretic layer 214. The second optical adhesive layer 250 is disposed between the protective layer 230 and the barrier layer 220, so that the protective layer 230 can be bonded on the barrier layer 220. In the embodiment, the first optical adhesive layer 240 and the second optical adhesive layer 250 can be optical clear adhesive (OCA).

The light transmittances of the first optical adhesive layer 240 and the second optical adhesive layer 250 are more than about 90%. Therefore, the barrier layer 220 and the protective layer 230 can be boned above a display surface 211 of the display panel 210 by the first optical adhesive layer 240 and the second optical adhesive layer 250 without affecting light incident to or emitted from the display panel 210. The first optical adhesive layer 240 has a first thickness $T_1$. The second optical adhesive layer 250 has a second thickness $T_2$. The first thickness $T_1$ is larger than the second thickness $T_2$.

Since the active matrix substrate 212 has sufficient strength, it is difficult to be damaged due to impact. Therefore, impact strength test of the display device 200 is usually carried out by applying an impact force above the protective layer 230. In other words, during the process of the impact strength test of the display device 200, because the impact force on the second optical adhesive layer 250 is greater than that on the first optical adhesive layer 240 and the impact force is continuous, the second optical adhesive layer 250 may be deformed easily to degrade the impact resistance strength. Thus, increasing the thickness $T_2$ of the second optical adhesive layer 250 would not improve the impact resistance strength of the display device 200 effectively.

On the other hand, during the process of the impact strength test of the display device 200, because the hardness of the barrier layer 220 is greater than that of the first optical adhesive layer 240 and the second optical adhesive layer 250, the barrier layer 220 disposed between the first optical adhesive layer 240 and the second optical adhesive layer 250 can prevent the first optical adhesive layer 240 from being deformed with the deformation of the second optical adhesive layer 250. Therefore, increasing the thickness $T_1$ of the first optical adhesive layer 240 would improve the impact resistance strength of the display device 200, and thus the lifetime of the display device 200 would be increased.

Specially, in the embodiment, the impact resistance strength of the display device 200 in the condition which the first thickness $T_1$ is twice as large as the second thickness $T_2$ is 25 times as large as that of the display device 200 in the condition which the thicknesses of the first optical adhesive layer 240 and the second optical adhesive layer 250 are the same.

Referring to FIG. 2 again, in the embodiment, the protective layer 230 includes an optical treatment surface 232 and a back surface 234 opposite to each other. The back surface 234 is located on the second optical adhesive layer 250. For example, the optical treatment surface 232 can be an anti-glare surface, an anti-fogging surface or an anti-reflective surface, so as to further improve display quality of the display device 200.

Figure 4:
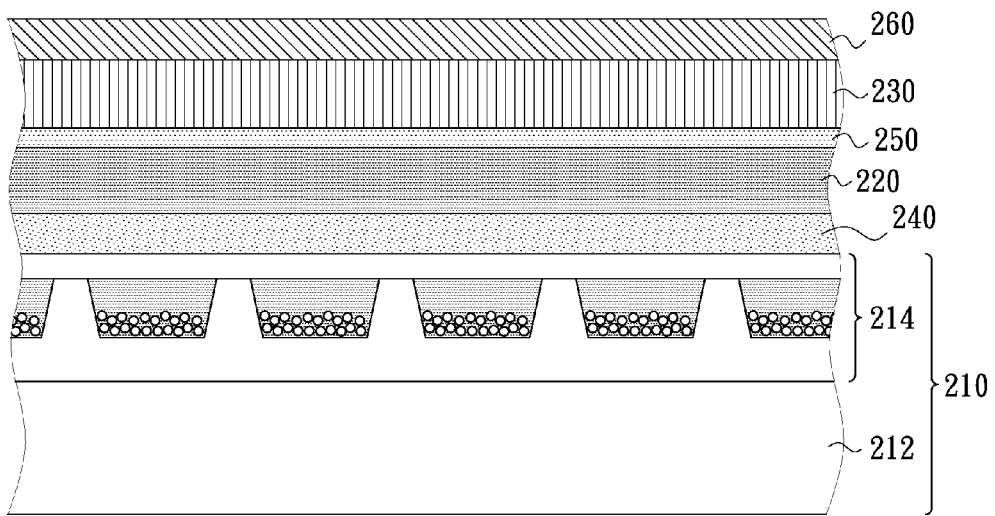
FIG. 4 is a schematic cross-sectional view of a display device according to another embodiment of the present invention.

In addition, in other embodiment, referring to FIG. 4, at least one optical film 260 is further disposed on the protective layer 230. The optical film 260 can be an anti-glare film, an anti-fogging film or an anti-reflective film, and the present invention is not limited herein.

In summary, in the display device of the present invention, the thickness of the first optical adhesive layer disposed between the display panel and the barrier layer is larger than that of the second optical adhesive layer disposed between the protective layer and the barrier layer, and the hardness of the barrier layer is greater than that of the first optical adhesive layer. Therefore, even if the impact force is applied above the protective layer of the display device and the impact resistance strength of the second optical adhesive layer is degraded due to deformation, the barrier layer would still prevent the first optical adhesive layer from being deformed. Therefore, with the relatively thick first optical adhesive layer, the display device can have the sufficient impact resistance strength, and thus the lifetime of the display device would be increased.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An electrophoretic display device comprising:
   an electrophoretic display panel;
   a barrier layer disposed above the electrophoretic display panel;
   a protective layer disposed above the barrier layer;
   a first optical adhesive layer with a first thickness disposed between the electrophoretic display panel and the barrier layer; and
   a second optical adhesive layer with a second thickness being smaller than the first thickness disposed between the protective layer and the barrier layer.

2. The electrophoretic display device according to claim 1, wherein the electrophoretic display panel comprises an electrophoretic display panel.

3. The electrophoretic display device according to claim 2, wherein the electrophoretic display panel comprises a microcup electrophoretic display panel or a microcapsule electrophoretic display panel.

4. The electrophoretic display device according to claim 1, wherein material of the first optical adhesive layer and the second optical adhesive layer comprises optical clear adhesive.

5. The electrophoretic display device according to claim 1, wherein the first thickness is twice as large as the second thickness.

6. The electrophoretic display device according to claim 1, further comprising at least one optical film disposed on the protective layer.

7. The electrophoretic display device according to claim 1, wherein the protective layer has an optical treatment surface and a back surface opposite to each other, and the back surface located on the second optical adhesive layer.

8. The electrophoretic display device according to claim 1, wherein the optical treatment surface comprises an anti-reflective surface or an anti-glare surface.

9. The electrophoretic display device according to claim 1, wherein material of the barrier layer comprises waterproof material or silicon dioxide.

10. The electrophoretic display device according to claim 1, wherein material of the protective layer comprises plastic.

11. The electrophoretic display device according to claim 10, wherein the material of the protective layer comprises polyethylene terephthalate.

\* \* \* \* \*